April 18, 1939.  L. A. CARTER  2,154,605
FLUID OPERATED CHANGE SPEED MECHANISM
Filed April 23, 1934   6 Sheets-Sheet 1
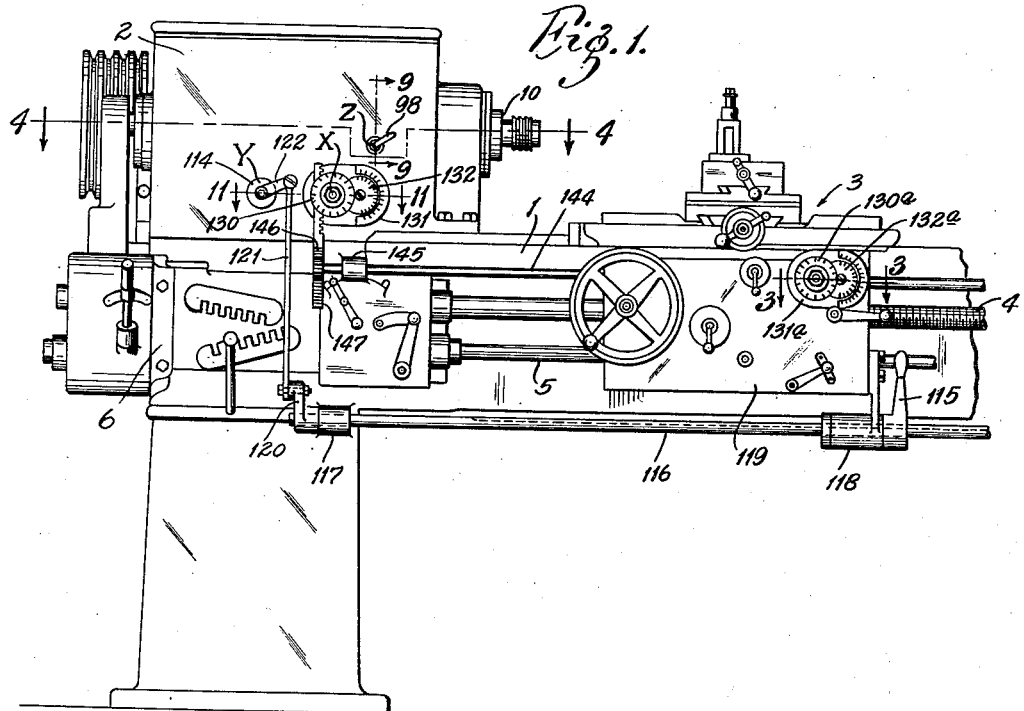
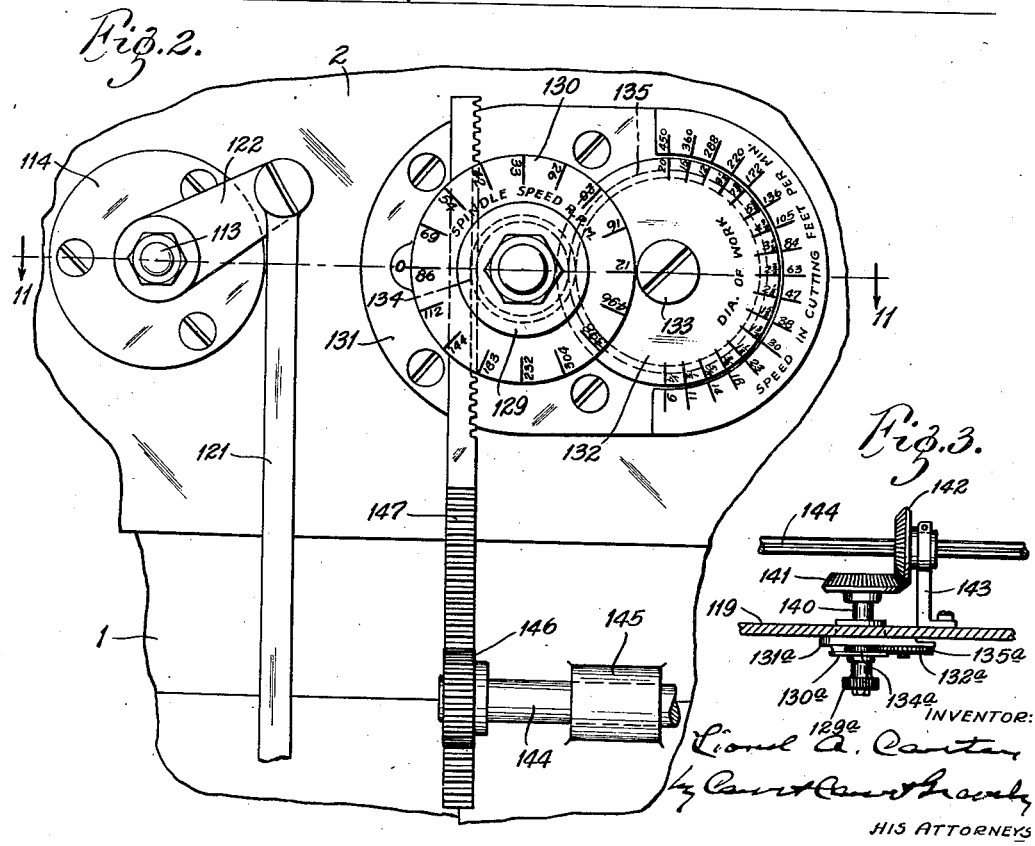
INVENTOR:
Lionel A. Carter
HIS ATTORNEYS

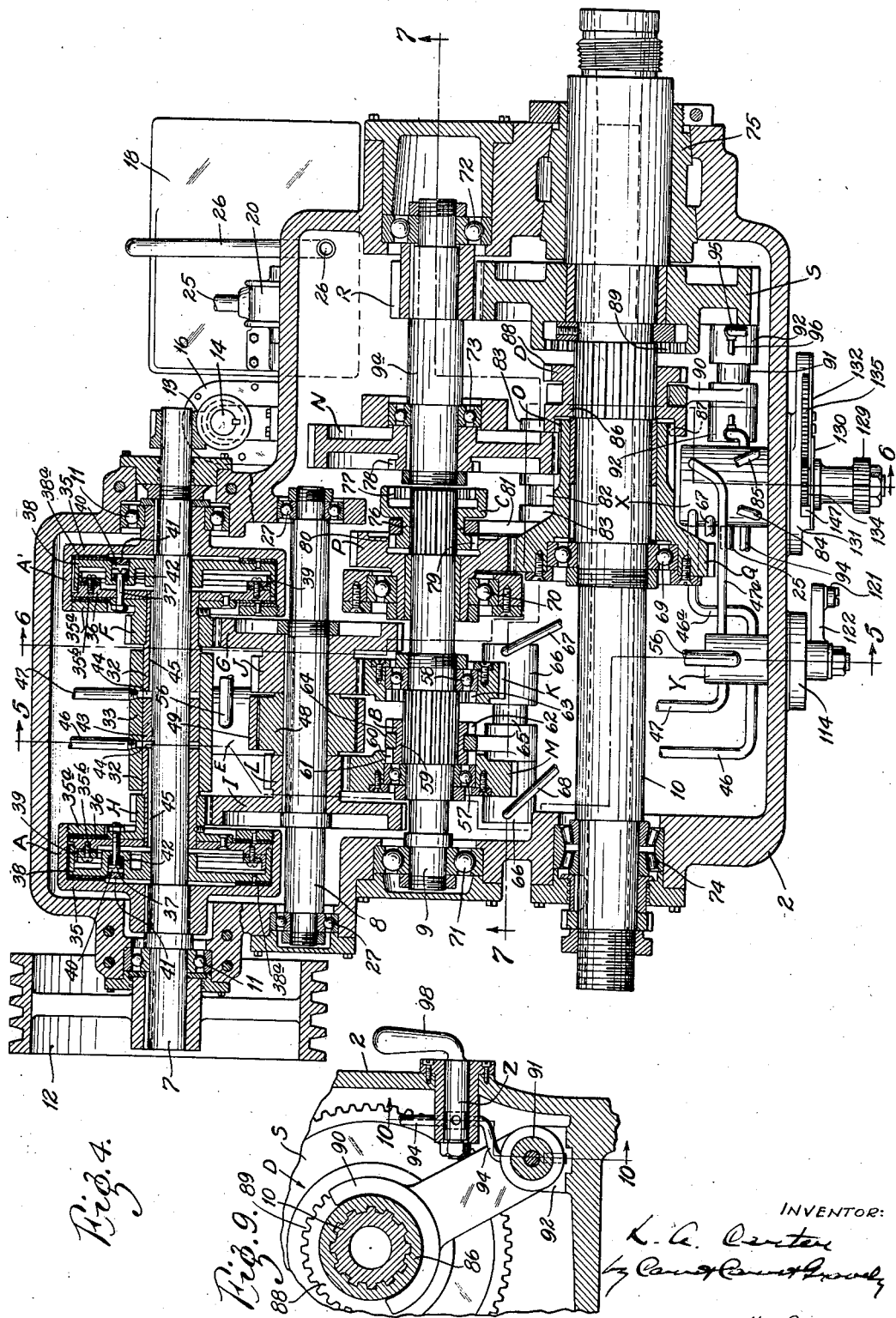

April 18, 1939.  L. A. CARTER  2,154,605
FLUID OPERATED CHANGE SPEED MECHANISM
Filed April 23, 1934  6 Sheets-Sheet 3
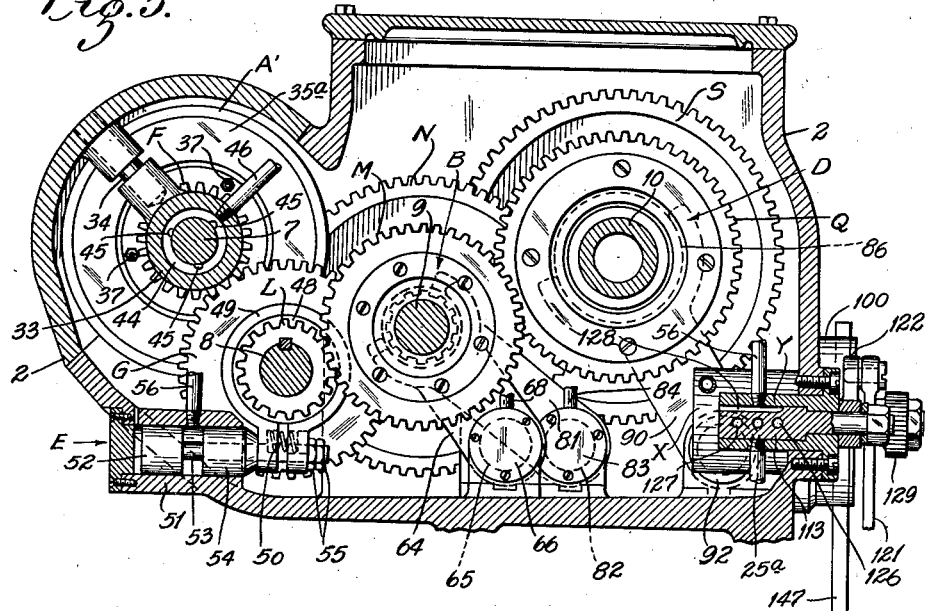
Fig. 5.
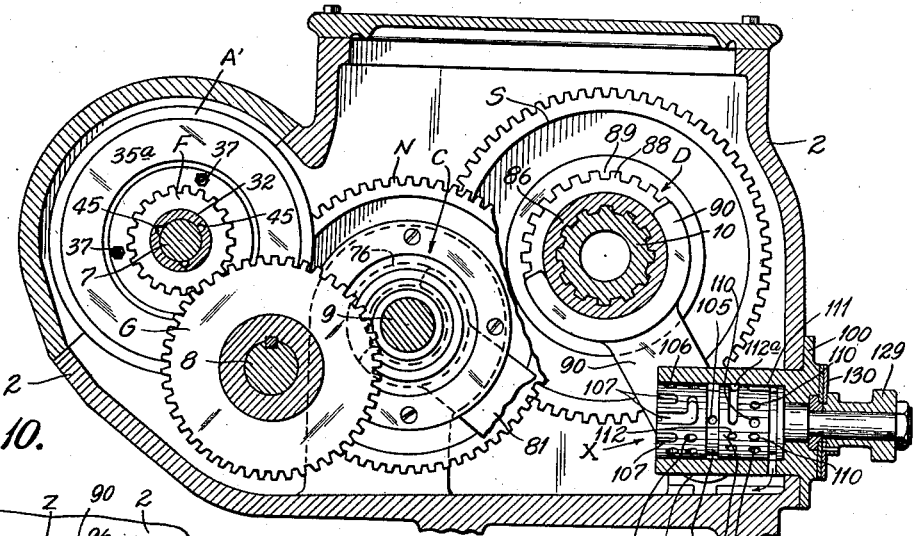
Fig. 6.
Fig. 10.
INVENTOR:
Lionel A. Carter
by Cramer & Cramer Hornly
HIS ATTORNEYS.

April 18, 1939.  L. A. CARTER  2,154,605
FLUID OPERATED CHANGE SPEED MECHANISM
Filed April 23, 1934   6 Sheets-Sheet 4
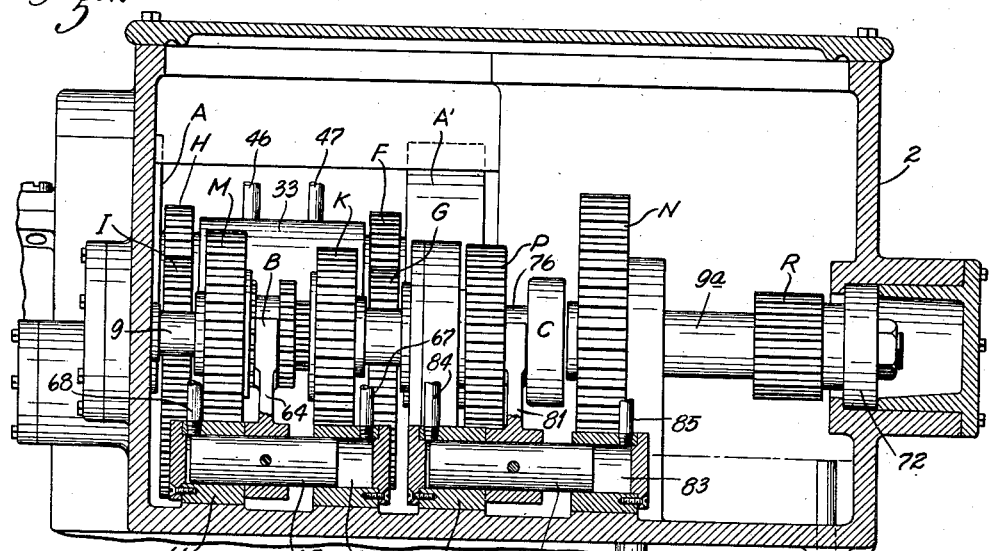
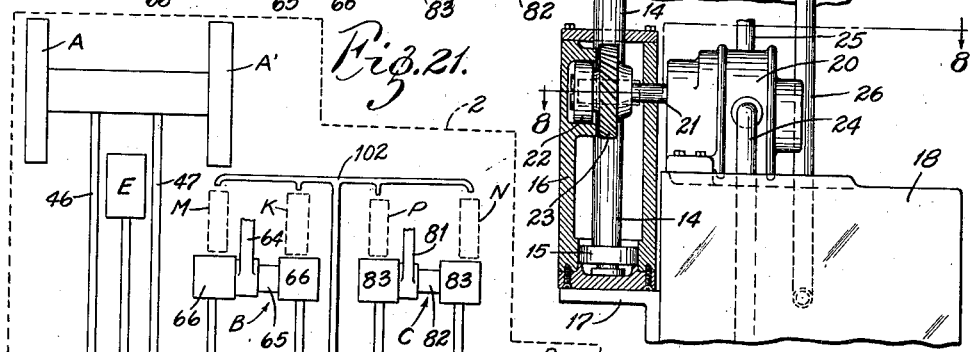
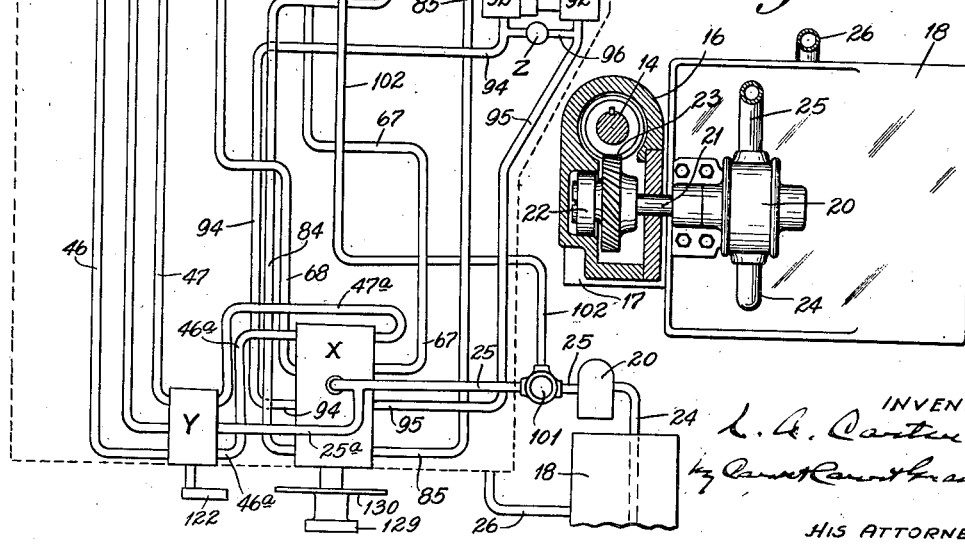
INVENTOR:
L. A. Carter
HIS ATTORNEYS.

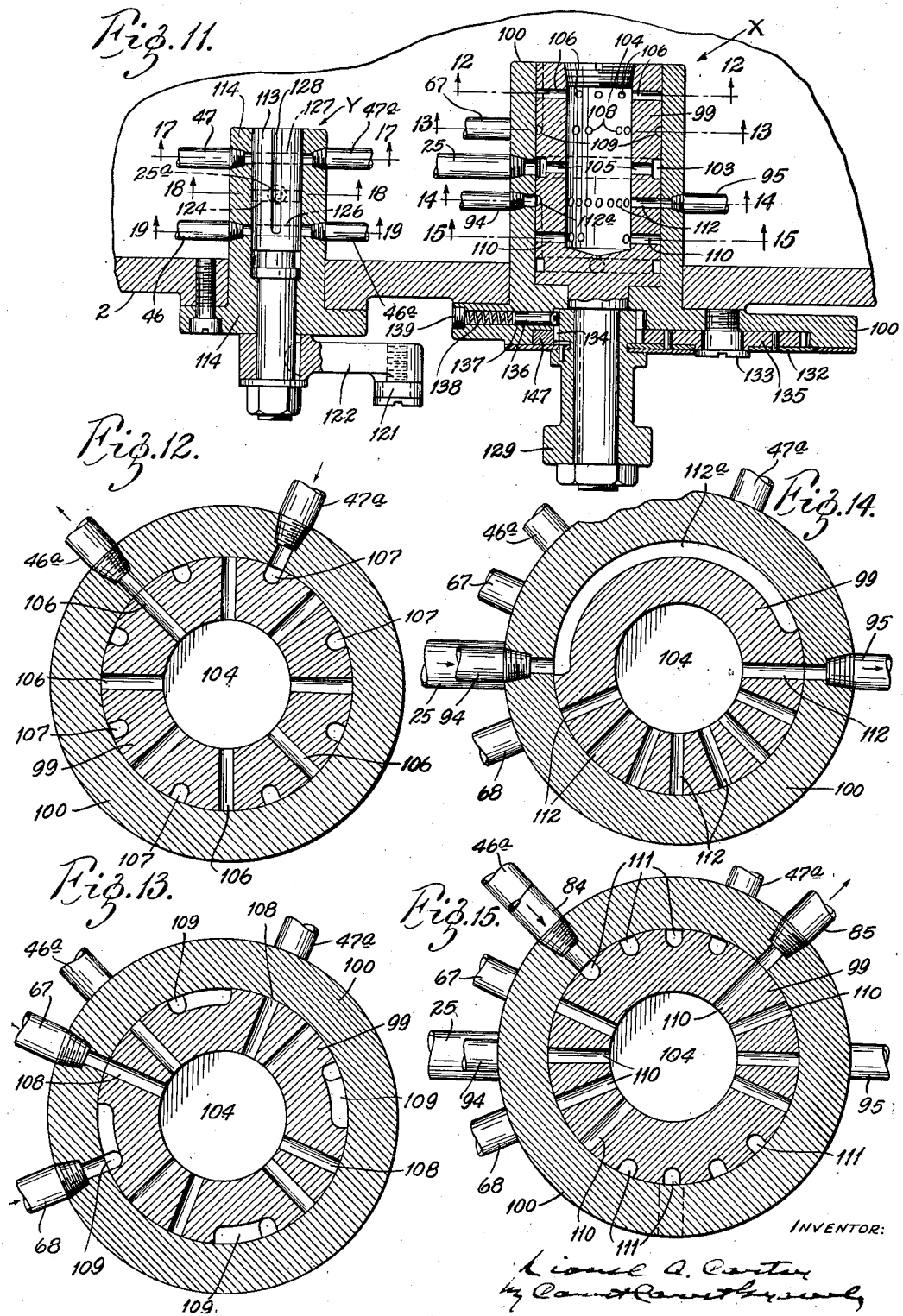

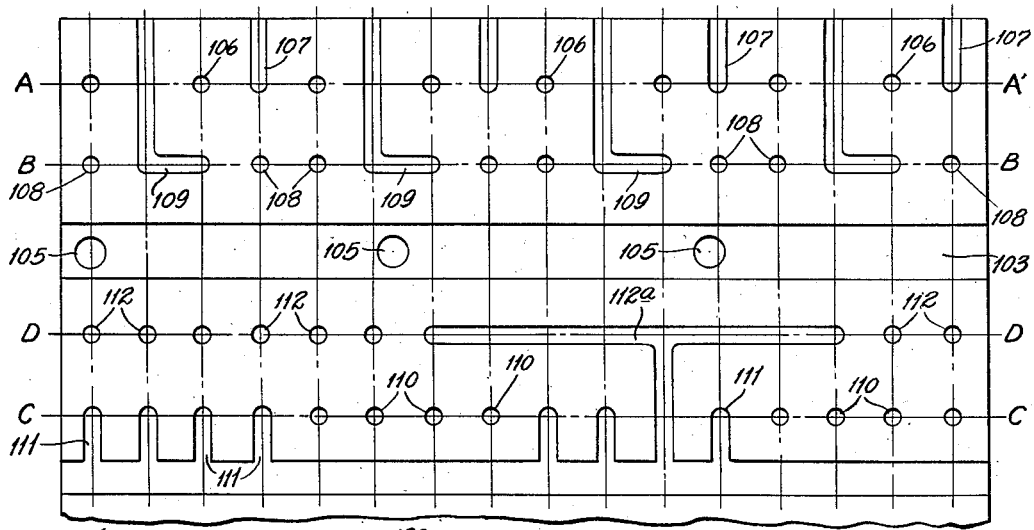

Patented Apr. 18, 1939

2,154,605

UNITED STATES PATENT OFFICE 2,154,605

FLUID OPERATED CHANGE SPEED MECHANISM

Lionel A. Carter, Webster Groves, Mo., assignor to Lehmann Machine Company, St. Louis, Mo., a corporation of Missouri Application April 23, 1934, Serial No. 721,974

21 Claims. (Cl. 82—29)

This invention relates to change speed mechanisms, particularly fluid operated change speed mechanisms for the geared headstocks of lathes.

It has for its principal objects to provide a simple, efficient and compact mechanism of the above type wherein the oil for lubricating the mechanism is utilized as the pressure medium for actuating the various pressure responsive clutches for obtaining the different spindle speeds; to provide a single control valve for operating the various clutches to obtain the desired selected speed, to provide means on the headstock and on the carriage for manipulating the speed control valve and for indicating the diameter of the work, the number of revolutions thereof and the cutting speed thereof; to provide means separate from the speed control valve and operable from the carriage for starting and stopping the spindle; to permit turning of said spindle by hand when setting up the work; and to obtain other advantages hereinafter appearing.

The invention consists in the fluid operated change speed mechanism and in the construction, combinations and arrangements of parts hereinafter described and claimed.

In the accompanying drawings, which form part of this specification and wherein like symbols refer to like parts wherever they occur, Fig. 1 is a front elevational view of a portion of a lathe having a headstock provided with a fluid operated change speed spindle driving mechanism embodying my invention, Fig. 2 is an enlarged fragmentary front elevation of the geared head showing the cooperating dials for controlling the change speed mechanism and for indicating the number of revolutions per minute of the spindle for various cutting speeds and work diameters, Fig. 3 is a fragmentary horizontal section through the carriage apron indicating dials on the line 3—3 in Fig. 1.

Fig. 4 is a horizontal section through the geared head approximately on the line 4—4 in Fig. 1, Fig. 5 is a vertical transverse section through the headstock on the line 5—5 in Fig. 4, Fig. 6 is a similar section approximately on the line 6—6 in Fig. 4, Fig. 7 is a vertical longitudinal section through the headstock on the line 7—7 in Fig. 4, Fig. 8 is a horizontal section on the line 8—8 in Fig. 7, Fig. 9 is an enlarged horizontal section on the line 9—9 in Fig. 1, Fig. 10 is a vertical section on the line 10—10 in Fig. 9, Fig. 11 is a horizontal section on the line 11—11 in Fig. 1, Figs. 12, 13, 14 and 15 are horizontal cross-sections through the control valve on the lines 12—12, 13—13, 14—14 and 15—15, respectively in Fig. 11, Fig. 16 is a diagrammatic view showing a development of the grooved outer peripheral surface of the control valve core, Figs. 17, 18 and 19 are vertical cross-sections through the start-and-stop valve on the lines 17—17, 18—18 and 19—19, respectively, in Fig. 11, Fig. 20 is a chart indicating the gears and clutches that are brought into operation in obtaining some of the spindle speeds; and Fig. 21 is a diagrammatic view illustrating the connections between the pump, valves, clutches and gears.

In the accompanying drawings, my fluid operated change speed mechanism is shown embodied in the geared headstock of an engine lathe; but it is also adapted to machines of other types.

Said lathe comprises a bed 1 provided with a headstock housing 2, a carriage 3 slidable on said bed towards and away from the headstock, a lead screw 4 for sliding said carriage when thread cutting, a feed rod 5 for sliding said carriage when doing work other than thread cutting, and a housing 6 located below said headstock and containing a suitable quick change mechanism (not shown) for driving said lead screw and said feed rod at different selected speeds. The construction of geared head engine lathe thus far described is well known and it is considered unnecessary to illustrate it in detail.

The headstock housing 2 has four horizontally spaced parallel shafts journaled therein; namely, a drive shaft 7, a primary countershaft 8, a secondary countershaft comprising sections 9 and 9a, and a spindle 10, which carries at its forward end the usual chuck or face plate (not shown) for supporting the work or stock that is to be operated upon. The drive shaft 7 is supported in antifriction bearings 11 provided therefor in the opposite ends of the housing 2. One end of the drive shaft 7 extends beyond the rear end of the housing 2 and has a drive pulley 12 fixed thereto; and the other end of said drive shaft projects beyond the front end of said housing and is operatively connected by helical gearing 13 to the upper end of a vertical shaft 14 journaled in an antifriction bearing 15 provided therefor in a housing 16.

The housing 16 is mounted on a bracket 17 that projects laterally from a lubricant supply tank 18 located below the headstock housing 2. Mounted on the tank 18 is a suitable rotary pump 20, whose shaft 21 extends into the housing 16 and is supported therein in an antifriction bearing 22 and has a helical gear connection 23 with the upright shaft 14. A pipe 24 leads from the bottom of the tank 18 to the inlet side of the pump 20, a pipe 25 leads from the outlet side of said pump for supplying lubricant to the headstock housing 2 and to the various pressure responsive devices hereinafter described, and a pipe 26 leads from the lower portion of the headstock housing to said tank for returning the lubricant to the latter, this return pipe projecting far enough above the bottom of the headstock housing to maintain a proper level of the lubricant therein.

The primary countershaft 8 is journaled at its ends in antifriction bearings 27 mounted in the headstock housing 2, and is driven from the drive shaft 7 at either of two speeds. One speed ratio is obtained by a gear F that intermeshes continuously with a gear G fixed to the primary countershaft 8; and the other speed ratio is obtained by a gear H that intermeshes continuously with a gear I fixed to said primary countershaft. The drive gears F and H are fixed to the remote ends of a pair of sleeves 32 that surround the drive shaft and have their inner end portions mounted for independent rotary and axial sliding movement in the outer ends of a suitable supporting bearing 33, which is held against rotary and axial movement by means of a pin connection 34 with the headstock housing 2.

The sleeve supported gears F and H are adapted to be selectively coupled to the drive shaft 7 for rotation therewith by means of independently operated friction disk clutches A', A, respectively, of the same construction. Each of these disk clutches comprises a cup shaped clutch element 35 that is fixed to the drive shaft 7 and has an annular plate 35a threaded into the outer end of its peripheral flange, a clutch element or disk 36 that is secured by bolts 37 to the adjacent sleeve supported gear F or H for rotary and axial sliding movement therewith, and a circumferentially flanged clutch element or disk 38 that is slidably and rotatably mounted on said drive shaft and is connected by said bolts to the clutch element 36 for rotation therewith and for axial sliding movement relative thereto.

The clutch disks 36 and 38 are located within the continuously rotating cup shaped clutch element 35; and the disk 36 has a cup leather 39 secured thereto that fits within the circumferential flange of the disk 38 to prevent loss of pressure between the outer edges of said disks. The bolts 37 have their head ends located in pockets or recesses 40 provided therefor in the circumferentially flanged clutch disk 38 and extend through alined holes in the bottoms of said pockets, the disk 36, and an outstanding flange on the adjacent end of the sleeve supported gear F or H. The pockets or recesses 40 are closed by means of plugs 41; and springs 42 are sleeved on the bolts 37 between the bottoms of said pockets and the heads of said bolts therein and operate to move the disks 36 and 38 towards each other into inoperative position. The clutch disk 38 is provided with a suitable clutch facing material 38a adapted to frictionally engage the end wall of the continuously rotating clutch element 35, the threaded annular plate 35a of which has a similar clutch facing material 35b secured thereto adapted to be frictionally engaged by the clutch disk 36.

An oil-tight bushing 43 for the shaft 7 is fixed in the supporting bearing 33 intermediate between the ends thereof and serves to separate the pair of gear supporting sleeves 32 in the ends thereof and also to prevent the flow of oil from one sleeve to the other. In the disengaged position of the clutches A and A', the sleeve 32 of each clutch terminates short of the bushing 43, forming a chamber 44 which communicates with the space between the clutch disks 36 and 38 through a series of circumferentially spaced longitudinal grooves 45 formed in the bore of said sleeve. Oil is supplied to the disk clutches A and A' through separate pipes 46 and 47 that lead to the chambers 44 of the respective clutches. By this arrangement, when the oil is forced into either chamber 44, it flows through the longitudinal passageways 45 into the space between the two clutch disks 36 and 38 and forces them apart into frictional engagement with the clutch member 35 fixed to the drive shaft 7 thereby causing the gear of that clutch to rotate with said shaft. When the pressure is relieved, the springs 42 operate to disengage the clutch disks 36 and 38 from the clutch element 35.

The primary countershaft 8 is provided with a fluid operated brake mechanism E comprising a collar 48, which is fixed to said shaft intermediate between gears J and L thereon, and a split brake band 49 adapted to frictionally engage the periphery of said collar. The brake band 49 is normally held in released position by means of a coil spring 50 interposed between the split ends thereof. The brake is applied by means of a double piston mounted in a cylinder 51 formed integral with the headstock housing 2. One member 52 of this double piston is provided with a rod 53 which extends through the other member 54 thereof and through alined openings provided therefor in the ends of the brake band 49 and is provided at its end with nuts 55. Pressure exerted by the spring 50 forces the pistons 52 and 54 toward each other and spreads the brake band. Oil is supplied to the cylinder 51 between the adjacent inner ends of the pistons 52 and 54 by means of a pipe 56, thereby forcing said pistons apart and thus causing the brake band 49 to grip the collar 48 fixed to the primary countershaft 8 and thus stop rotation thereof.

Two speed ratios are obtained between the primary countershaft 8 and the secondary countershaft. One speed ratio is obtained by the gear L, which is fixed to the primary countershaft 8 and intermeshes continuously with a gear M that is rotatably supported on the secondary countershaft section 9 by means of an antifriction bearing 57. The other speed ratio is obtained by the gear J, which is fixed to the primary countershaft 8 and intermeshes continuously with a gear K rotatably mounted on the secondary countershaft section 9 by means of an antifriction bearing 58.

The gears M and K are selectively clutched to the secondary countershaft section 9 to rotate the same by a fluid operated clutch mechanism B comprising a clutch sleeve 59 that is slidably splined on said shaft intermediate between said gears. The sliding clutch member 59 is provided on the side nearest the gear M with external clutch teeth 60 adapted to cooperate with internal clutch teeth 61 formed on said gear; and the other side of said clutch member is likewise provided with external clutch teeth 62 adapted to engage internal clutch teeth 63 on the gear K. The sliding clutch member 59 is actuated by means of a shifter fork 64 having its hub fixed to a piston 65 whose ends are slidably supported in cylinders 66. As shown in Figs. 4, 7 and 21, the clutch 59 is shifted into engagement with the gear M by oil supplied through a pipe 67 to the inner end of the right hand cylinder; and oil supplied to the left hand cylinder through a pipe 68 shifts said clutch into engagement with the gear K.

Four speed ratios are obtained between the secondary countershaft and the spindle 10. The second speed ratio is obtained by means of a gear R, which is fixed to the forward end of the forward section 9a of the secondary countershaft and intermeshes continuously with a larger gear S rotatably mounted on a spindle 10. High speed ratio is obtained by means of a gear N, which is fixed to the shaft section and intermeshes continuously with the smaller gear O of a double gear rotatably supported on said spindle by an antifriction bearing 69. The third speed ratio is obtained by means of a gear P, which is rotatably mounted on said shaft section by means of an antifriction bearing 70 and intermeshes continuously with the larger gear Q of the double gear of said spindle. The lowest speed ratio is obtained by driving through the gears P and Q, O and N, and R and S.

The rear section 9 of the secondary countershaft is supported at its rear end in an antifriction bearing 71 located in the rear wall headstock housing 2; and the forward end of said shaft section is supported by the antifriction bearing 70 for the gear P. The forward section 9a of the secondary countershaft is supported at its front end in an antifriction bearing 72 mounted in the front wall of the headstock housing 2; and the rear end portion of said section is rotatably supported in an antifriction bearing 73 mounted in the upper portion of said housing. The spindle 10 is supported at its rear end in a double taper roller bearing 74 mounted in the rear wall of the headstock housing and at its forward end in a plain taper bearing 75 mounted in the forward end of said housing.

The two sections 9 and 9a of the secondary countershaft are connected to rotate together by means of a fluid operated clutch mechanism C· comprising a clutch sleeve 76 that is slidably splined upon the forward end of the rear section 9 of said shaft between the gears P and N. This sliding clutch member is provided in its forward end with internal clutch teeth 77 adapted to be engaged with external clutch teeth 78 formed on the gear N fixed to the forward secondary countershaft section. The rear end of said clutch member is provided with external clutch teeth 79 adapted to be clutched with internal clutch teeth 80 formed in the gear P in which the forward end of the rear secondary countershaft section is journaled. The clutch 76 is operated by a shifter fork 81 fixed to a piston 82 whose ends are mounted in cylinders 83 located in the bottom of the headstock housing. As shown in Figs. 7 and 21, said clutch is shifted into engagement with gear N by means of oil supplied to the left-hand cylinder through a pipe 84 and is shifted into engagement with the gear P by oil supplied to the right-hand cylinder through a pipe 85.

A fluid operated clutch mechanism D comprises a clutch sleeve 86 which is slidably splined on the spindle 10 between the double gear O, Q and the gear S and is provided at its rear end with internal clutch teeth 87 adapted to engage the small gear O of the double gear so as to force said spindle to rotate with said double gear. The forward end of the clutch sleeve is provided with external clutch teeth 88 adapted to be interlocked with internal clutch teeth 89 formed on the gear S and cause the spindle to rotate therewith. The clutch sleeve 86 is actuated by means of a shifter fork 90 whose hub portion is fixed to a piston 91 whose opposite ends are slidably mounted in cylinders 92 provided therefor in the bottom of the housing 2. As shown in Fig. 10, the piston 91 is normally centered between the two cylinders 92 by means of coil springs 93 interposed between the ends of said cylinders and the inner ends of bores provided therefor in said piston. The clutch 86 is clutched with the spindle gear S by means of oil pressure supplied to the left-hand cylinder by means of a pipe 94. The piston is shifted in the opposite direction to cause the spindle to rotate with the double gear O, Q by means of oil supplied to the right-hand cylinder through a pipe 95. The two pipes 94 and 95 are connected by a cross-pipe 96 having a rotary valve Z therein which is mounted in the front side of the headstock and is provided with an operating handle 98 in convenient reach of the operator (see Figs. 1, 9 and 10). When the handle of this valve is operated to establish communication with the pipes leading to the two cylinders, the pressure therein is neutralized and the springs 93 move the clutch to neutral position. This arrangement permits turning of the spindle by hand when setting up a piece of work and it also prevents accidental starting of the lathe.

The hereinbefore described arrangement of shafts, clutches and gears provides sixteen spindle speeds which are obtained by a corresponding number of angular adjustments of a single rotary control valve X which controls the admission and discharge of the oil in the cylinders for operating the various clutches. As shown in Figs. 11 to 16, said control valve X comprises a core 99 that is rotatably mounted in a casing 100 mounted in the front side wall of the headstock 2.

Fig. 16 illustrates a development of the core 99 of the control valve X with the sixteen spindle speeds indicated thereon opposite the different admission and relief ports in the valve; and with lines A—A', B—B, C—C and D—D passing through the ports that control the operation of the clutches A, A', B, C and D, respectively. The chart of Fig. 20 has indicated thereon the various spindle speeds, the letters used to designate the different gears, and arrows indicating the particular gears that are brought into operation to obtain spindle speeds of 20, 69, 86 and 389, respectively. As shown in Fig. 21, the oil is supplied to the main control valve through the pipe 25 leading from the outlet side of the pump 20. This pipe has a relief valve 101 located therein which has a pipe line 102 leading therefrom which terminates in a plurality of outlets 102a located in the headstock housing 2 in position to discharge oil therefrom over the gears M, K, P and N. This relief valve may be set for a predetermined pressure so that any excess pressure therein causes the oil to by-pass through said valve into the pipe and be discharged upon the gears M, K, P and N. As shown in Fig. 11, oil flowing through the pipe 25 from the pump 20 enters an annular groove 103 formed in the periphery of the rotary control valve core 99 and thence passes into a chamber 104 therein through a series of radially disposed ports 105 leading from said groove to said chamber. Leading from said chamber (see Fig. 12) is a series of radial ports 106 adapted to be brought into register with either one of two pipes 46a or 47a that communicate with the pipes 46 and 47 leading to the disk clutches A and A', respectively. Formed in the periphery of the valve core 99 is a series of longitudinal grooves forming exhaust ports 107 which communicate at their outer ends with the atmosphere and are adapted to be brought into communication at their inner ends with the pipes 46a and 47a leading to the disk clutches A and A', respectively. The spacing of the radial ports 106 and exhaust ports 107 is such that when one of the radial ports is brought into register with the pipe leading to one of the friction clutches one of the exhaust ports is brought into register with the pipe leading to the other of said clutches, thereby preventing simultaneous operation of both clutches.

As shown in Fig. 13, the valve core 99 is also provided with a series of radial ports 108 adapted to establish communication between the chamber 104 and the pipes 67 or 68 leading to the clutch mechanism B for coupling the gears M and K to the countershaft section 9; and said core is also provided with a series of exhaust ports 109, one of which is adapted to be brought into communication with one of said pipes when communication is established between the other pipe and said chamber through one of said radial ports.

As shown in Fig. 14, the valve core 99 is also provided with a series of radial ports 112, which supply oil to the pipes 94 and 95 leading to the clutch mechanism D for coupling the gears S and Q to the spindle 10, and a semiannular discharge port 112a a portion of which is brought into register with one of said pipes when the other pipe is in register with one of said radial ports.

As shown in Fig. 15, the valve core 99 is also provided with properly spaced radial ports 110 adapted to establish communication between the chamber 104 and either of the pipes 84 or 85 and the clutch mechanism C for coupling together the sections 9 and 9a of the secondary propeller shaft. Said valve is also provided with a series of exhaust ports 111 for exhausting one of said pipes when the other is in communication with said chamber.

The change speed mechanism is started and stopped by means of a valve Y located in the pipes 46 and 47 leading to the friction clutches A and A'. Said valve comprises a valve core 113 rotatable in a casing 114 that is mounted in the front side wall of the headstock adjacent to the control valve X. The core 113 is rotated by means of a handle 115 fixed to a rock shaft 116 journaled in bearings 117 and 118 provided therefor in the lathe bed 1 and the carriage apron 119, respectively. The rear end of said rock shaft is provided with an arm 120 that has a link connection 121 with an arm 122 fixed to the exposed outer end of the valve core 113. The handle 115 moves with the carriage and has a spline connection with the shaft 116.

As shown in Figs. 11, 18 and 21, the pipe 25 leading from the pump 20 to the speed control valve X has a branch 25a which is adapted to communicate through a diametral port 124 in the rotary core 113 of the start-and-stop valve Y with the pipe 56 that leads to the brake operating mechanism E. Said core is also provided on opposite sides of the port 124 with diametrical ports 126 and 127, respectively. As shown in Figs. 11, 19 and 21, the bore 126 is adapted to establish communication between the speed control valve and the clutch A through the pipes 46 and 46a; and the bore 127 is adapted to establish communication between said speed control valve and the clutch A' through the pipes 47 and 47a.

The core of the start-and-stop valve Y is also provided with a longitudinal groove forming an exhaust port 128 adapted in the stop position of said valve to be brought into communication with the pipes 46 and 47 leading from the clutches A and A', respectively, and the pipe 56 leading to the brake E.

When the start-and-stop valve Y is in the start position shown in Figs. 17, 18 and 19, the pipe 56 leading to the brake E is open to the atmosphere through the exhaust port 128, thus releasing said brake; and communication is established between the speed control valve X and the clutches A and A' and one of said clutches is engaged and the other is released, depending upon the position of said speed control valve, through the ports 126 and 127. When the start-and-stop valve Y is rotated ninety degrees to the left, flow of the oil to the clutches A and A' is cut off and the pipes 46, oil is supplied to the brake E to apply the same through the pipe 25a, port 124 and pipe 56, and the exhaust port 128 is in register with the pipes 46 and 47 and the pressure on the clutches A and A' is relieved, thereby preventing operation of said clutches.

The core 99 of the speed control valve X is provided with a knob 129 for manipulating it and a dial 130 having graduations thereon indicating in revolutions per minute the sixteen spindle speeds that they may be obtained. These graduations are adapted to be brought into register with a zero or index mark to indicate the spindle speed for which the valve is set. This index or zero mark is located on a plate 131 that is secured to the outer side face of the headstock back of the dial. A second dial 132 is rotatably mounted on a pivot 133 fixed to the plate 131 and has one half of its peripheral marginal portion graduated to indicate a numerically arranged selection of work diameters in the range of lathe's capacity. These graduations are adapted to be brought into register with similarly circumferentially spaced graduations that are marked on the plate and indicate the speed in cutting feet per minute of the work. The two dials 130 and 132 are provided with intermeshing gears 134 and 135, respectively. The dial 130 is geared to the dial 132 so that the former makes one complete revolution to one-half revolution of the latter, thereby preventing confusion that might result from a complete revolution of the dial 132. With this arrangement, the operator sets the dial 132 so that the graduation indicating the diameter of the work is opposite the graduation indicating the cutting speed required for said work (said speed being usually specified on the working blue prints furnished the operator and being governed by the material and tools being used) thus setting the speed control valve to bring into operation the gears that give the nearest spindle speed obtainable for the desired cutting speed.

As shown in Fig. 11, the speed control valve X is provided with means for accurately locating the valve core 99 in the different positions of its rotary adjustment. Said means comprises a plunger 136 slidably mounted in a bore 137 which is formed in the plate 131 and extends radially of the valve axis. The plunger has a rounded inner end portion that is held in the spaces between the teeth of the gear 134 by a spring 138 interposed between the outer end of said plunger and a threaded plug 139 which closes the outer end of the bore 137. With this arrangement, the spring-pressed locating plunger 136 is held in engagement with the gear 134 with sufficient pressure to keep the valve core in position, but said pressure is not sufficient to prevent said core from being manually rotated.

A combined indicating dial and speed control valve operating mechanism is also mounted on the carriage apron, said mechanism comprises a dial 130a similar to the dial 130, a dial 132a similar to the dial 130 and a plate 131a similar to the plate 131. The dial 130a is fixed to a shaft 140 journaled in the carriage apron 119 and provided with a knob 129a and a gear 134a that intermeshes with a gear 135a for rotating the dial 132a. The shaft 140 is provided at its inner end with a bevel gear 141 which intermeshes with a bevel gear 142 journaled in a bracket 143 provided therefor on the carriage apron. The bevel gear 142 has a splined connection with a shaft 144 that is disposed above and extends parallel to the lead screw 4. The rear end of this shaft is journaled in a bearing 145 provided therefor on the lathe bed 1 below the indicating dial on the headstock and is provided with a pinion 146 that meshes with a rack 147 which in turn cooperates with the gear 134 of the dial 130. With this arrangement, the speed control valve X may be properly adjusted either by rotating the dials on the headstock or the dials on the carriage apron. The operator would ordinarily use the apron dials, thereby giving the supervisor an unobstructed view of the headstock dial in checking the dial setting.

The hereinbefore described arrangement has numerous advantages. It provides sixteen spindle speeds, any one of which may be readily obtained by operating the speed control valve X from either the headstock or the carriage; and it also provides means at each of these points for determining the setting of said speed control valve and for indicating such setting. The mechanism may be quickly and easily started and stopped from the carriage independently of the speed control valve; and operation of the lathe spindle by accidental movement of the start-and-stop lever during the operation of setting up the work may be prevented by adjusting the valve Z hereinbefore described to set said clutch D in neutral position, which setting adjustment also permits turning of the spindle by hand.

The friction clutches A and A' are self-compensating and thus require no adjustment for wear; and the pistons for operating each of the positive clutches B, C and D are limited in their travel by the abutting of their forks against the open ends of the cylinders for said pistons, thereby reducing the end thrust on the bearings for the members against which said clutches contact.

When the start-and-stop valve Y is in stop position, the oil is by-passed through the relief valve 101 and is continuously distributed over the gears as a lubricant during the operation of the pump; and after a certain amount of such oil is accumulated in the bottom of the headstock housing for use as a splash lubricant, it is returned to the supply tank and is again used as a lubricant and pressure medium. The oil that is exhausted from the various pipe lines is also discharged into the headstock.

Obviously, the hereinbefore described arrangement admits of considerable modification without departing from the invention. Therefore, I do not wish to be limited to the precise construction shown and described.

What I claim is:

1. A change speed mechanism having a primary shaft and a countershaft, two clutches on the primary shaft and a plurality of clutches on the countershaft, fluid pressure control means for said clutches, said means including a single control valve for selectively actuating said clutches, a pipe leading from said control valve to each of said friction clutches, said control valve being adapted to supply pressure to one of the primary shaft clutches while relieving the pressure on the other primary shaft clutch, a second valve in the pipes leading from said control valve to said primary shaft clutches for rendering the latter inoperative by said control valve, and a fluid operated brake for said mechanism adapted to be applied by said second valve when the primary shaft clutches are rendered inoperative thereby.

2. A change speed mechanism having a primary shaft, a countershaft and a final drive shaft, two clutches on the primary shaft and a plurality of clutches on the countershaft, fluid pressure control means for said clutches, said means including a single control valve for selectively actuating said clutches, a pipe leading from said control valve to each of said friction clutches, said control valve being adapted to supply pressure to one of the primary shaft clutches while relieving the pressure on the other primary shaft clutch each of the countershaft and final drive shaft clutches including a piston, a cylinder for shifting the piston in one direction and a cylinder for shifting it in the other direction, means associated with said control valve for supplying fluid pressure to the respective cylinders, said valve being adapted to relieve the pressure in one of said cylinders when the pressure is applied to the other of said cylinders, a second valve for cutting off communication between said control valve and said primary shaft clutches and for relieving the pressure on the latter, a fluid operated brake for said mechanism adapted to be applied by said second valve when the primary shaft clutches are rendered inoperative thereby, a third valve for establishing communication between the two cylinders of the final drive shaft clutch to neutralize the pressure therein, and springs cooperating with the operating pistons for said last mentioned clutch for moving the same to inoperative position when the pressure in the operating cylinders therefor is neutralized.

3. In a machine tool provided with a change speed spindle driving mechanism including a rotatable member for adjusting said mechanism to obtain the desired spindle speeds, a dial rotatable with said member and having graduations thereon adapted to cooperate with the index mark on said tool to indicate the speed of said spindle, and a second dial journaled on said tool and geared to said first mentioned dial, said second dial having graduations thereon indicating the diameter of the work, said tool being provided with graduations indicating the circumferential cutting speed of the work and cooperating with the graduations on said last mentioned dial.

4. In a machine tool provided with a change speed spindle driving mechanism including a plurality of fluid pressure operated clutches, a single rotary control valve for selectively operating said clutches, a dial rotatable with said valve and having graduations thereon adapted to cooperate with an index mark on said tool to indicate the speed of the spindle, and a second dial journaled on said tool and geared to said first mentioned dial and having graduations thereon indicating the diameter of the work, said tool being provided with graduations indicating the circumferential cutting speed of the work and cooperating with the graduations on said last mentioned dial.

5. In a lathe having a carriage and a headstock provided with a change speed spindle driving mechanism including a member rotatably mounted on said headstock for adjusting said mechanism to obtain the desired spindle speeds, means on said headstock and operable with said member for indicating the diameter of the work, the spindle speed and the cutting speed, and a similar indicating mechanism mounted on said carriage and operatively connected to said first mentioned indicating mechanism.

6. In a lathe having a headstock provided with a change speed spindle driving mechanism including a plurality of fluid pressure operated clutches, a carriage, a single rotary control valve for selectively operating said clutches, a dial fixed to said valve and having graduations thereon adapted to cooperate with an index mark on the headstock to indicate the speed of the spindle, a second dial journaled on said headstock and geared to said first mentioned dial, said second mentioned dial having graduations thereon indicating the diameter of the work, said headstock being provided with graduations indicating the circumferential cutting speed of the work and cooperating with the graduations on said last mentioned dial, and a similar indicating mechanism mounted on said carriage and operatively connected to said first mentioned indicating mechanism.

7. In a lathe having a headstock provided with a carriage and a change speed spindle operating mechanism including a plurality of fluid operated clutches, a single rotary control valve for selectively operating said clutches, a dial fixed to said valve and having graduations thereon adapted to cooperate with an index mark on the headstock to indicate the speed of the spindle, a second dial journaled on said headstock and geared to said first mentioned dial, said second mentioned dial having graduations thereon indicating the diameter of the work, said headstock being provided with graduations indicating the circumferential cutting speed of the work and adapted to cooperate with the graduations on said last mentioned dial, a similar indicating mechanism mounted on said carriage and operatively connected to said first mentioned indicating mechanism, a second valve for rendering some of said clutches inoperative by said first mentioned valve, and means on said carriage for operating said second valve.

8. A change speed mechanism comprising a housing, a drive shaft, a primary countershaft, a sectional secondary countershaft, a final drive shaft, a gear rotatable on said drive shaft and intermeshing continuously with a gear fixed to said primary countershaft, a second gear rotatable on said drive shaft and intermeshing continuously with a second gear fixed to said primary countershaft, clutches for coupling the gears on the drive shaft thereto, a third gear fixed to said primary countershaft and intermeshing continuously with a gear rotatable on one section of said secondary countershaft, a fourth gear fixed to said primary countershaft and intermeshing continuously with a second gear rotatable on said secondary countershaft section, a clutch for selectively clutching the two gears on said secondary countershaft section therewith, a third gear rotatable on said secondary countershaft section and intermeshing continuously with a gear rotatable on said final drive shaft, a gear on the other section of said secondary countershaft intermeshing continuously with a gear rotatable with said final drive shaft gear, a clutch for connecting the third gear on said first mentioned secondary countershaft section therewith and for connecting together said first and second secondary countershaft sections, a second gear fixed to said second mentioned secondary countershaft section and intermeshing with a third gear rotatable on said final drive shaft, and a clutch for clutching said first and second gears and said third gear of said final drive shaft thereto.

9. A change speed mechanism comprising a housing, a drive shaft, a primary countershaft, a sectional secondary countershaft, a final drive shaft, a gear rotatable on said drive shaft and intermeshing continuously with a gear fixed to said primary countershaft, a second gear rotatable on said drive shaft and intermeshing continuously with a second gear fixed to said primary countershaft, clutches for coupling the gears on said drive shaft thereto, a third gear fixed to said primary countershaft and intermeshing continuously with a gear rotatable on one section of said secondary countershaft, a fourth gear fixed to said primary countershaft and intermeshing continuously with a second gear rotatable on said secondary countershaft section, a clutch for selectively clutching the two gears on said secondary countershaft section therewith, a third gear rotatable on said secondary countershaft section and intermeshing continuously with a gear rotatable on said final drive shaft, a gear on the other section of said secondary countershaft intermeshing continuously with a gear rotatable with said final drive shaft gear, a clutch for connecting the third gear on said first mentioned secondary countershaft section therewith and for connecting together said first and second secondary countershaft sections, a second gear fixed to said second mentioned secondary countershaft section and intermeshing with a third gear rotatable on said final drive shaft, a clutch for clutching said first and second gears and said third gear of said final drive shaft thereto, and a single control means for selectively operating all of said clutches.

10. A change speed mechanism comprising a housing, a drive shaft, a primary countershaft, a sectional secondary countershaft, a final drive shaft, a gear rotatable on said drive shaft and intermeshing continuously with a gear fixed to said primary countershaft, a second gear rotatable on said drive shaft and intermeshing continuously with a second gear fixed to said primary countershaft, clutches for coupling the gears on said drive shaft thereto, a third gear fixed to said primary countershaft and intermeshing continuously with a gear rotatable on one section of said secondary countershaft, a fourth gear fixed to said primary countershaft and intermeshing continuously with a second gear rotatable on said secondary countershaft section, a clutch for selectively clutching the two gears on said secondary countershaft section therewith, a third gear rotatable on said secondary countershaft section and intermeshing continuously with a gear rotatable on said final drive shaft, a gear on the other section of said secondary countershaft intermeshing continuously with a gear rotatable with said final drive shaft gear, a clutch for connecting the third gear on said first mentioned secondary countershaft section therewith and for connecting together said first and second secondary countershaft sections, a second gear fixed to said second mentioned secondary countershaft section and intermeshing with a third gear rotatable on said final drive shaft, a clutch for clutching said first and second gears and said third gear of said final drive shaft thereto, a single control means for selectively operating said clutches, and means for rendering the main drive shaft clutches inoperative by said control means.

11. In a change speed mechanism having a primary shaft, a countershaft and a final drive shaft, clutches on said shafts, fluid pressure actuated devices for operating the respective clutches, a single control valve for selectively operating all of said clutches, a second valve for rendering the two primary shaft clutches inoperative by said control valve, the final drive shaft clutch including a piston operable by pressure supplied to the opposite ends thereof, yieldable means tending to move said last mentioned piston to neutral position, and a third valve for equalizing the pressure on the ends of said piston for permitting the same to move to neutral position.

12. A change speed mechanism having a primary shaft and a countershaft, a friction clutch on the primary shaft and a positive clutch on the countershaft, a fluid pressure control means for said clutches, said means including a single control valve for selectively actuating said clutches, and a second valve interposed between said control valve and the clutch on the primary shaft for rendering it inoperative by said control valve.

13. In a change speed mechanism having a disengageable primary power transmission device, a disengageable secondary power transmission device, a manually operable control member for selectively operating said primary and secondary power transmission devices, and a manually operable start-and-stop device adapted in the stop position thereof to prevent operation of said primary power transmission device by said control member.

14. In a change speed mechanism having a disengageable primary power transmission device, a disengageable secondary power transmission device, a manually operable control member for selectively operating said primary and secondary power transmission devices, a brake for said mechanism, and a manually operable start-and-stop device adapted in the stop position thereof to prevent operation of said primary power transmission device by said control member and for bringing about the application of said brake at the same time.

15. In a change speed mechanism having a disengageable primary power transmission device, a disengageable secondary power transmission device, a fluid pressure system for operating said devices, a manually operable control valve in said system for selectively operating said primary and secondary power transmission devices, and a manually operable start-and-stop valve in said system between said control valve and said primary power transmission device and adapted in stop position to render said primary power transmission device inoperative by said control valve.

16. In a change speed mechanism having a primary clutch, a secondary clutch, a manually operable control member for selectively operating said clutches and a manually operable start-and-stop device adapted in the stop position thereof to render said primary clutch inoperative by said control member.

17. In a change speed mechanism having a primary clutch including a continuously rotating clutch element, a secondary clutch, a fluid pressure system for operating said clutches, a single control valve in said system for selectively operating all of said clutches, and a second valve located in said system between said primary clutch and said control valve for rendering said primary clutch inoperative by said control valve.

18. In a change speed mechanism having a plurality of primary clutches each including a continuously rotating clutch element, a plurality of secondary clutches, a fluid pressure system for operating said clutches, a single control valve for selectively operating all of said clutches, a brake for said mechanism, and a second valve in said system between said control valve and said primary clutches for preventing operation thereof by said control valve and for bringing about the application of said brake at the same time.

19. In a change speed mechanism having a continuously rotating primary drive shaft, a driven shaft, two clutches on said primary shaft for transmitting motion therefrom to said driven shaft, a clutch on said driven shaft, a fluid pressure control system for said clutches including a single control valve for selectively operating said clutches, said control valve being adapted to supply pressure to one of said primary shaft clutches while relieving the pressure on the other of said primary shaft clutches, and a second valve in said system between said primary shaft clutches and said control valve for rendering said primary shaft clutches inoperative by said control valve.

20. In a machine tool provided with a change speed spindle driving mechanism including a plurality of independently adjustable speed changing devices a single control member for selectively adjusting all of said devices to obtain all of the different spindle speeds, and means associated with said single control member for indicating the diameter of the work, the spindle speed and the cutting speed, said means being operatively connected to said single control member to be actuated solely thereby over the entire range of speed changes.

21. In a machine tool provided with a change speed driving mechanism including a rotatable member for adjusting said mechanism to obtain the desired spindle speeds, a movable scale actuated by said rotatable member and adapted to cooperate with an index mark on said tool to indicate the speed of said spindle, a second scale movable with said first mentioned scale and adapted to indicate the diameter of the work and a stationary third scale adapted to indicate the circumferential cutting speed of the work and cooperating with said second mentioned scale.

LIONEL A. CARTER.